Figure 1:
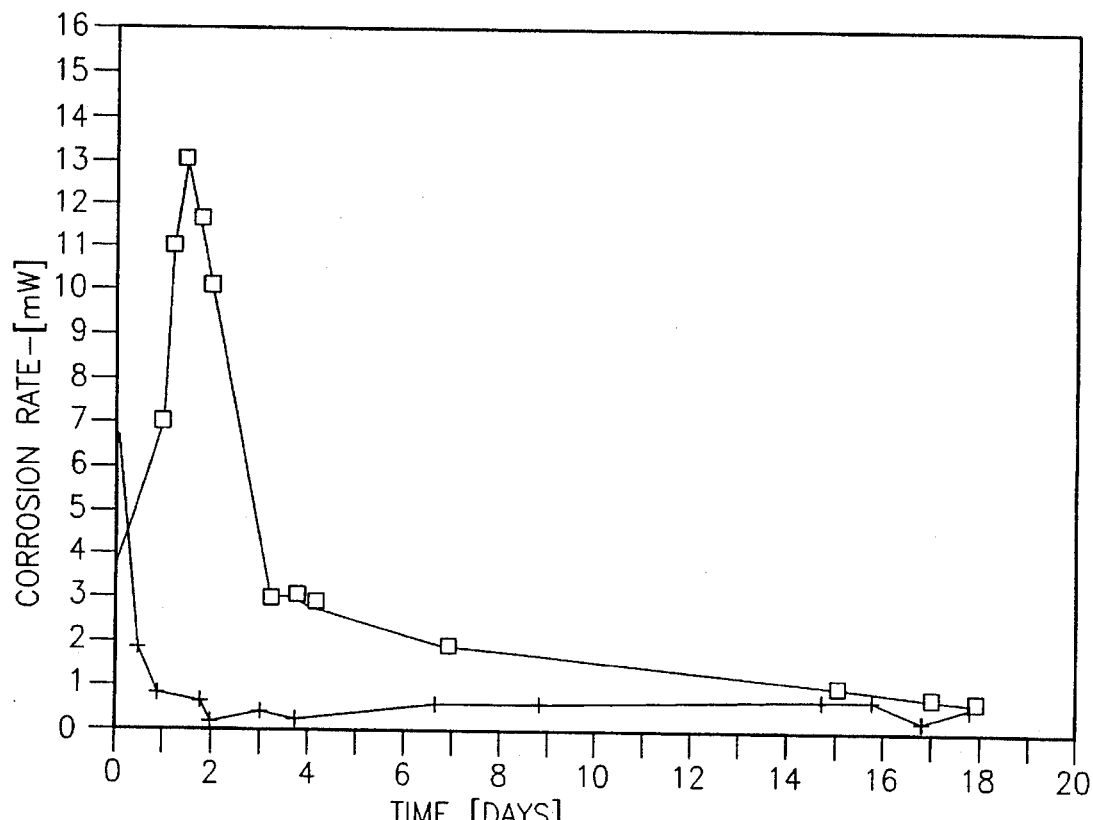

United States Patent [19]
Peled et al.

[11] Patent Number: 5,591,543
[45] Date of Patent: Jan. 7, 1997

[54] SECONDARY ELECTROCHEMICAL CELL

[75] Inventors: Emanuel Peled, Even Yehuda; Chen Menachem, Ariel; Aharon Gorenshtein, Bat Yam, all of Israel

[73] Assignee: Ramot University Authority for Applied Research and Industrial Development Ltd., Tel-Aviv, Israel

[21] Appl. No.: 441,628

[22] Filed: May 15, 1995

Related U.S. Application Data

[63] Continuation-in-part of Ser. No. 122,385, Sep. 16, 1993, abandoned.

[51] Int. Cl.$^6$ .............................. H01M 4/48; H01M 6/16
[52] U.S. Cl. .......................... 429/192; 429/197; 429/218
[58] Field of Search ................................ 429/194, 196, 429/197, 192, 218, 221, 223, 224, 210; 423/593, 594, 599; 252/182.1

[56] References Cited

U.S. PATENT DOCUMENTS

| | | | |
|---|---|---|---|
| 4,336,315 | 6/1982 | Eda et al. | 429/194 |
| 4,465,747 | 8/1984 | Evans | 429/194 |
| 4,770,960 | 9/1988 | Nagaura et al. | 429/218 X |
| 5,028,500 | 7/1991 | Fong et al. | 429/194 |
| 5,168,019 | 12/1992 | Sugeno | 429/194 |

*Primary Examiner*—Anthony Skapars
*Attorney, Agent, or Firm*—Edwin D. Schindler

[57] ABSTRACT

The invention relates to novel cathodes for secondary lithium cells and to lithium cells which contain such cathodes. The secondary cells can be charged and discharged substantially more times than corresponding cells which contain conventional $LiCoO_2$ type cathodes.

The cathodes are based on crystalline compounds of the $Li_1$ $_xM_{x/2}CoO_2$ type. One of the aspects of the invention is a process for the production of such crystalline cathodes, where M is selected from calcium, strontium, barium and magnesium and where the content of such bivalent cation M in the crystal is from about 0.1 weight-% to about 10 weight-%, preferably 0.2 to 5 weight-%. The novel crystalline cathode compound is synthesized by a solid/solid reaction at elevated temperature, generally in the 700° C. to about 900° C. range. The cathode may be prepared from small crystals of such a compound, in combination with a compatible binder or conductive material, such as graphite.

12 Claims, 5 Drawing Sheets

SECONDARY ELECTROCHEMICAL CELL

CROSS-REFERENCE TO RELATED APPLICATION

This is a continuation-in-part of application Ser. No. 08/122,385, filed Sep. 16, 1993, now abandoned.

FIELD OF THE INVENTION

The invention relates to secondary electrochemical cells having a novel $LiCoO_2$ type cathode, where instead of $LiCoO_2$ there is used a crystalline compound of the type $Li_{1-x}M_{x/2}CoO_2$, where M is selected from calcium, strontium, barium and magnesium, which contain about 1% to about 25% of the cation M. The cells have a high voltage and energy density and can be subjected to repeat charge/discharge cycles without substantial deterioration. The novel cells comprise such a cathode, a non-alithium, lithium alloy orlithium intercalcated carbonaceous anode. Various aprotic polymer, or composite solid electrolytes, as will be explained, can be used.

BACKGROUND OF THE INVENTION

The $Li/Li_x CoO_2$ cell attracts attention as a result of its high voltage and high energy density. However its high OCV and charging voltage cause eletrolyte oxidation. This problem is more severe in the $Li/Li_x CoO_2$ system where X is about 0.4–1.0 than in some other rechargeable lithium cells. Recently, $LiAsF_6$ in MF+DEC (or DMC) was suggested as an electrolyte for this cell. It was found that the presence of DEC and DMC increases the oxidation potential of the electrolyte. Cells with LiAsF-MF-DMC (or DEC) electrolye exhibited long cycle life but a relatively fast self-discharge.

At low x values $Li_x CoO_2$ is thermally unstable, below 0.3, and decomposes to $Li_1 CoO_2$ and cobalt oxide. The intercalation of lithium into the $Li_xCoO_2$ crystal causes a decrease in layer spacings. This may decrease the diffusion coefficient of lithium in $Li_x CoO_2$ for x values near unity.

It was hypothesized that the incorporation of a doubly charged but larger cation, such as $Ca^{++}$, $Sr^{++}$ or $Ba^{++}$ into the $Li_x CoO_2$ crystal lattice may increase the lattice spacings on one hand and stabilize it on the other.

The degradation modes of rechargeable (and also for primary lithium batteries are: (1) Reduction of the solvents and electrolyte salts at the anode (lithium, lithium alloy or lithium intercalated carbonaceous material). (2) Oxidation of the solvents or lithium salts at the cathode. (3) Degradation of the electrolyte due to polymerization reactions, hydrolysis reactions and other salt-solvent reactions. All these degradation processes are accelerated by impurities such as water and acids. Addition of desiccant and buffers which can absorb water and neutralize acids may thus increase the service life of these lithium batteries.

From the prior art there are known cathode materials which are of the formula corresponding to a mixture of $Li_2CO_3+Co_2O_3$, which are prepared by admixing the components and subjecting them to a high temperature.

EDA (U.S. Pat. No. 4,336,315) relates to a cell with a light metal anode, a cathode with manganese oxide as active material which also contains an alkaline earth oxide, and an organic electrolyte. As set out in column 2, lines 16 to 29, the alkaline earth metal oxide as solid base is admixed with the manganese dioxide to neutralize and inactivate the solid acidity, based on the surface hydroxyl groups of the manganese dioxide.

The cell of the '315 patent is a primary cell which cannot be recharged, and in this differs basically from the rechargable cells of the present invention.

Furthermore, the addition of an alkaline earth oxide serves to neutralize solid activity, and is in the form of an admixture and not incorporated into a crystalline compound. It is heated to 400° C. (column 3, line 56) for dehydration, by itself.

Figure 5:
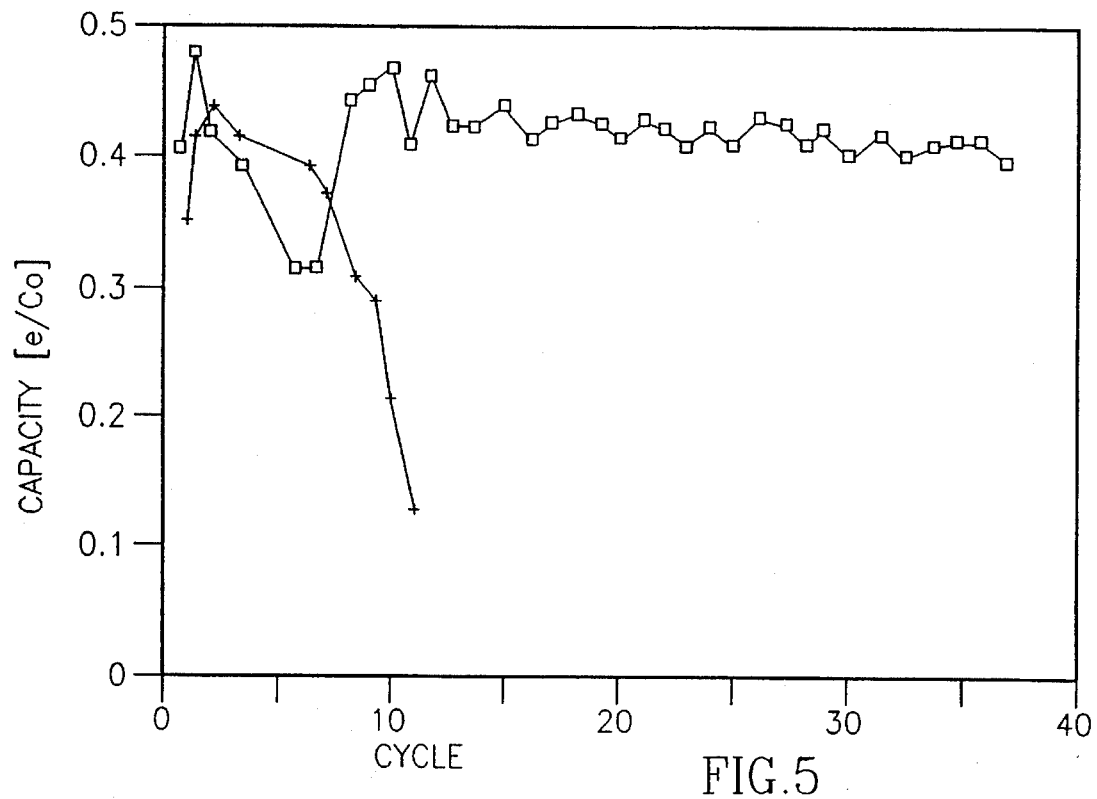

The EDA cell ought to be compared with the cells of the invention, and especially with FIG. 5 which indicates possible number of efficient cycles of the novel cell.

FONG (U.S. Pat. No. 5,028,500) relates to a carbonaceous electrodes for lithium cells, and the emphasis is on particulate carbonaceous electrodes intercalable with the alkali metal. A further emphasis is on the degree of graphitization of the carbon.

SUGENO (U.S. Pat. No. 5,168,019) relates to a secondary battery which contains an electrolyte to which there is added an oxide selected from $Al_2O_3$, $BaO_2$ and $MgO$, and where the cathode is made from a carbon material which may be doped with lithium, and where the anode is a composite oxide of lithium and cobalt.

This patent has nothing in common with the specific crystalline materials which are the material of the cathodes of the cells of the invention.

SUMMARY OF THE INVENTION

The invention relates to improved electrochemical cells of the $Li/Li_x CoO_2$ type, where x is in uncharged cells between about 0.4 and about 1. The cells of the invention have improved characteristics, and this due to the provision of cathodes which contain certain predominantly divalent cations. It is also possible to provide improved cells where such bivalent cations are added to the electrolyte. Amongst suitable cations there may be mentioned magnesium, calcium, barium, strontium, manganese, cobalt, nickel, vanadium (in various valency states). Another suitable component is titanium sulfide ($TiS_2$).

When incorporated into the cathode, the above bivalent cation Q are generally added so as to constitute from about 0.05 to about 10 weight-%, the preferred range being about 0.1 to about 5 weight-%.

Contrary to the known compositions which are essentially mixtures of the components, there is provided according to the present invention a cathode of the type $Li_1CoO_2$ in which part of the lithium, generally up to about 10%, is exchanged by another cation, preferably calcium or magnesium, so as to give a defined crystalline compound of the type:

$$Li_{1-x}Q_{x/2}CoO_2$$ 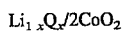

which has a well defined X-ray pattern. Such a stoichimetric compound is prepared by a solid/solid reaction at a temperature of the 900° C. range between compounds such as $Li_2O$, $CoO_2$, $CaCO_3$ or instead of $LiO^{++}$, $Li_2CO_3$.

If there exists a certain excess of CaO, $CaCO_3$, MgO or $MgCO_3$ these improve the quality of the cathode, and it is also desirable that these be present in the electrolyte. The Ca or Mg is also capable to come instead of a certain small quantity of the cobalt in the crystalline compound.

The present invention is further discussed with reference being made to the accompanying schematic drawing figures, in which:

FIG. 1 Corrosion of lithium-microcalorimeter tests. ■, C electrolyte; +, D electrolyte; calculated for 115 cm² electrodes area.

Figure 2:
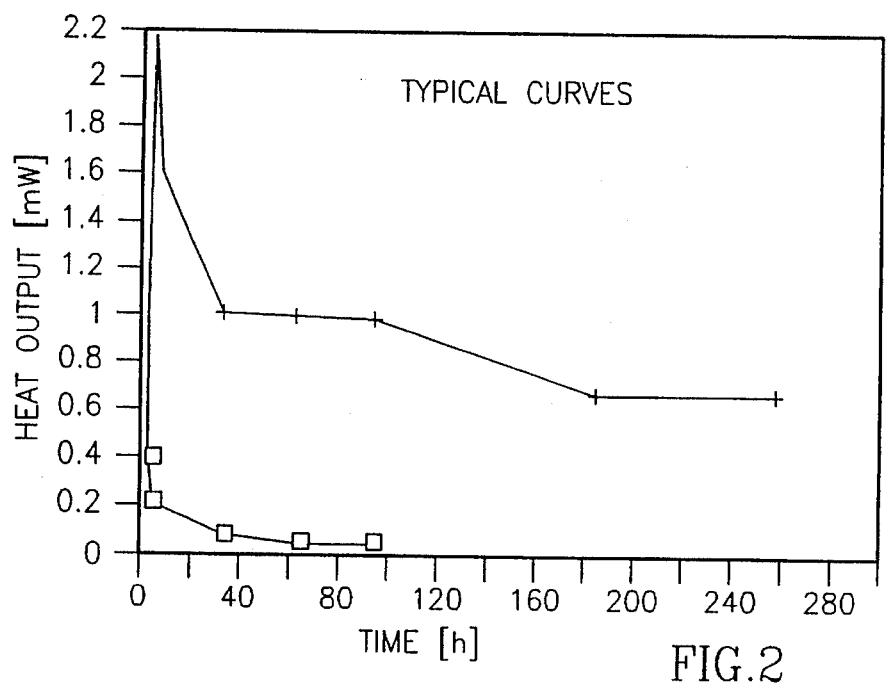

FIG. 2 Compatibility of the LiCoO$_2$ cathode with electrolytes-microcalorimeter tests. ■, C electrolyte; +, D electrolyte; calculated for 115 cm$^2$ electrodes area.

Figure 3:
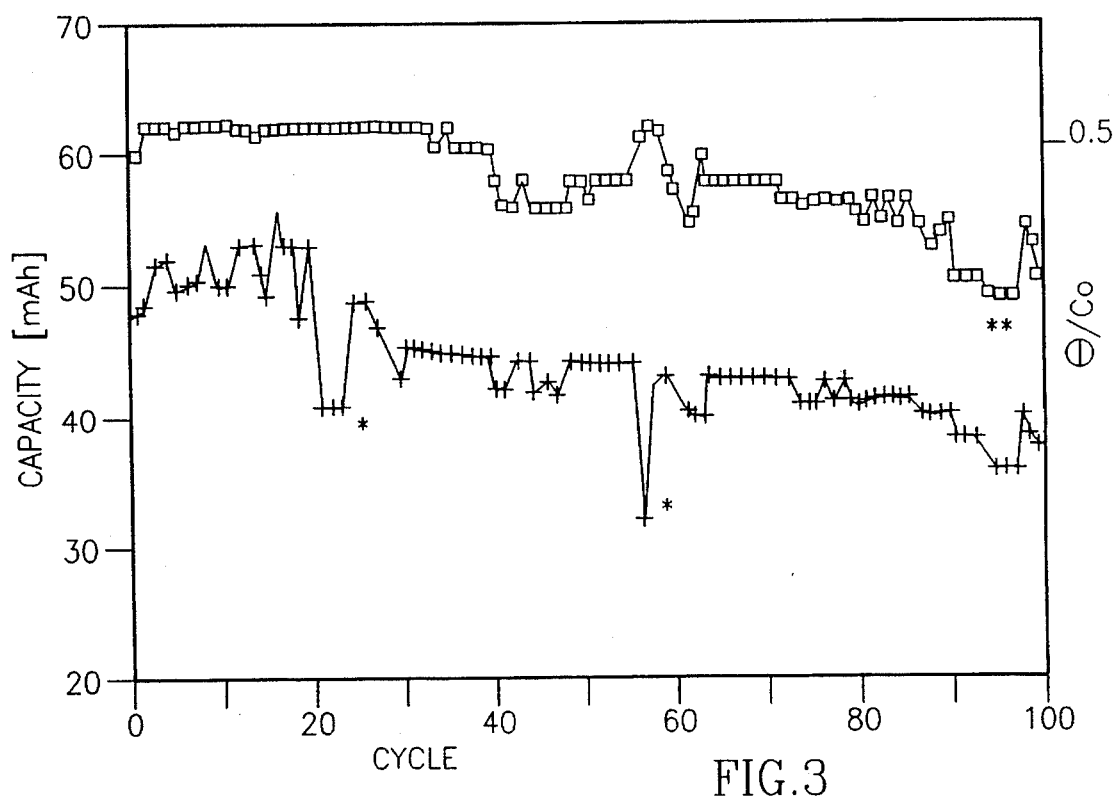

FIG. 3 Cycle life test of battery containing the C electrolyte. ■, Charge; +, discharge, *, cycle failure; **, cell internal connector failure.

Figure 4:
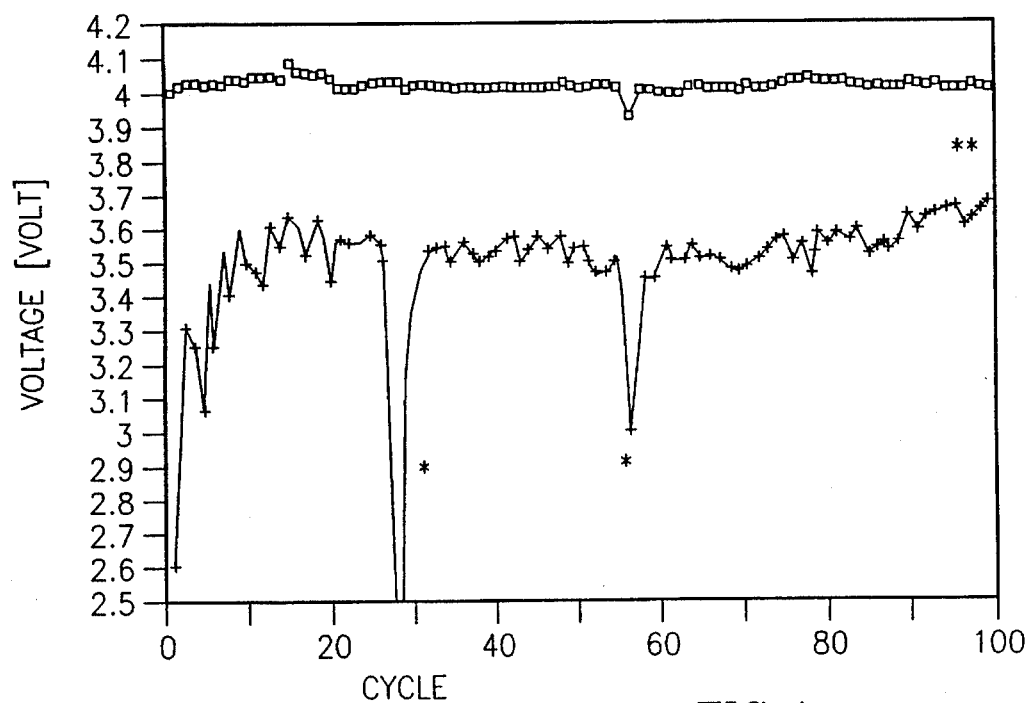

FIG. 4 Plots of OCV at the end of charge and at the end of discharge as a function of cycle number. C electrolyte; ■, Charge; +, discharge; *, cycle failure; **, cell internal connector failure.

FIG. 5 The effect of CaO addition to the cathode on cycle life for battery containing the D electrolyte. ■, Cathode with CaO; +, without CaO.

Figure 6:
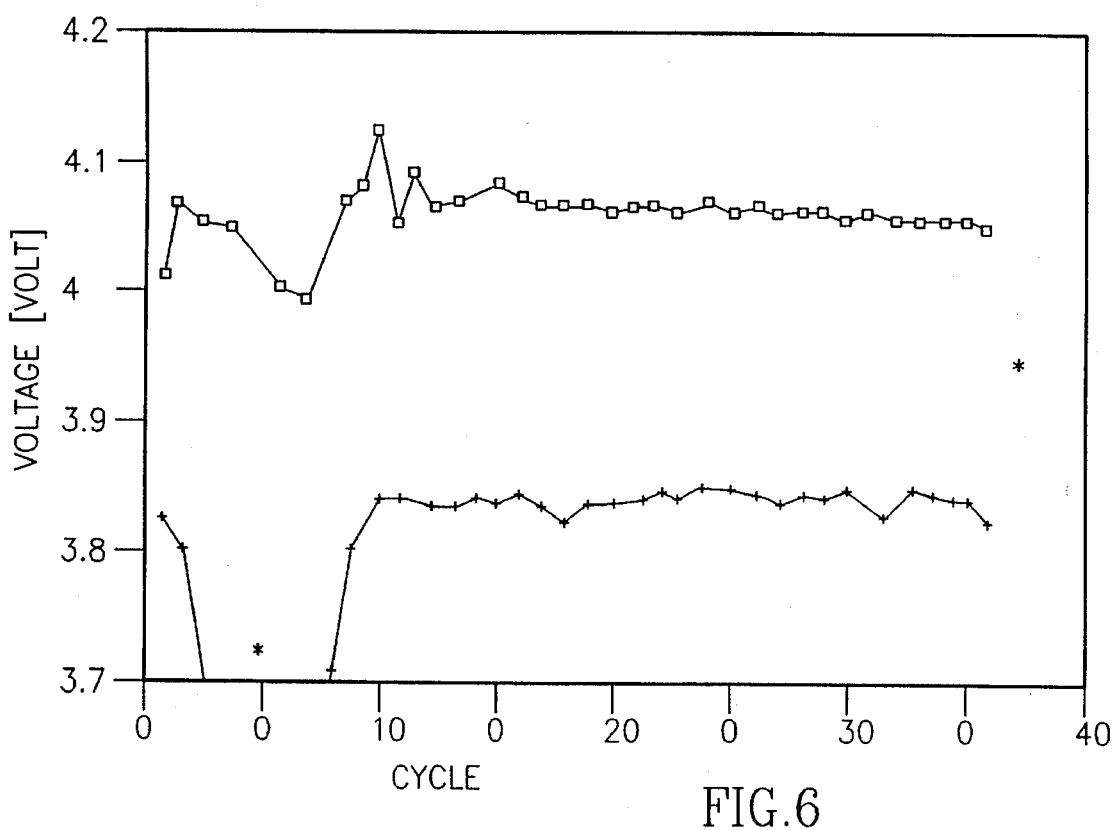

FIG. 6 Plots of OCV at the end of charge and at the end of discharge as a function of cycle number for battery with LiCoCO$_2$+CaO cathode and the D electrolyte. ■, Charge; +, discharge; *, cycle failure.

Figure 7:
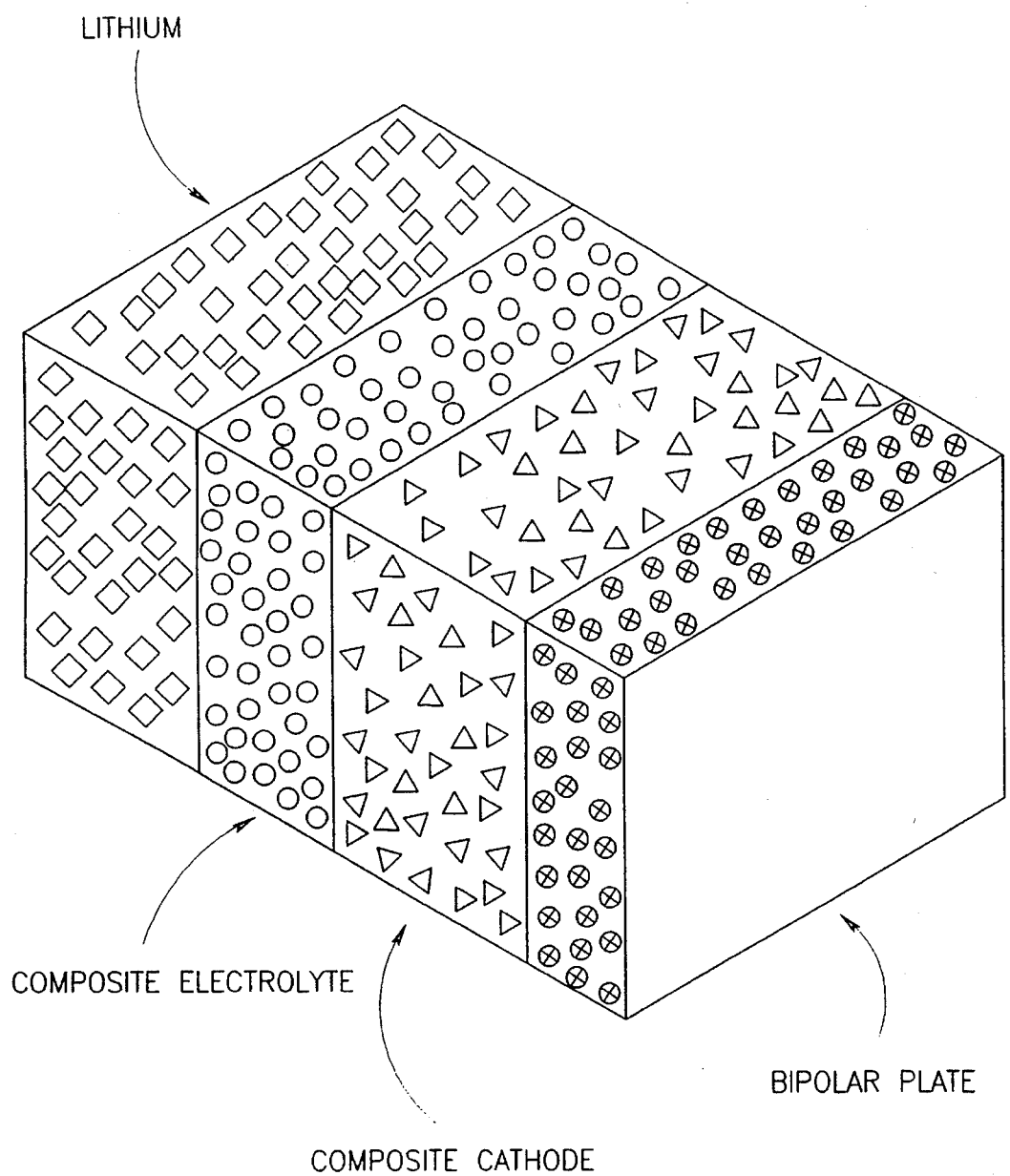

FIG. 7 Bipolar Battery Cell Configuration.

Figure 8:
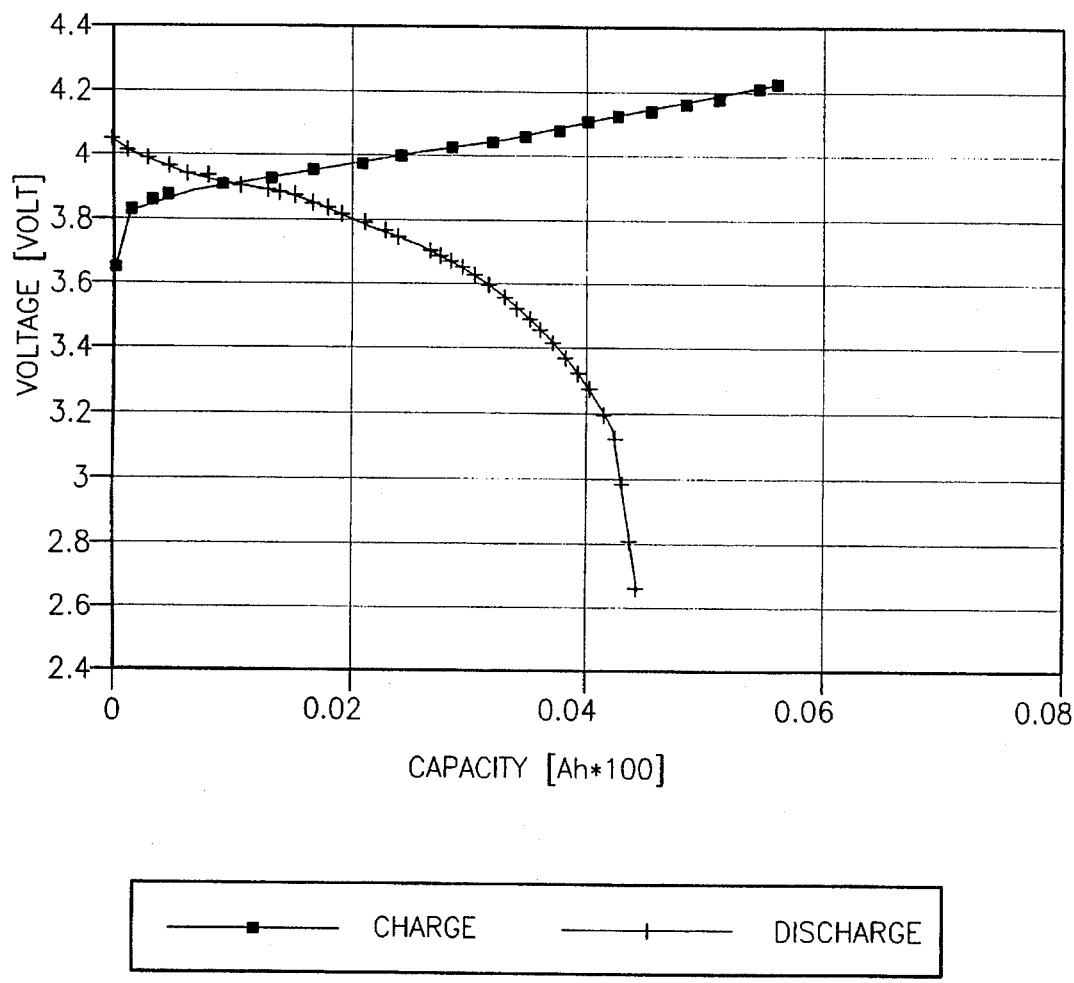

FIG. 8 The third charge/discharge cycle of Li/CSE/composite LiCoO$_2$ cathode cell at 70° C. The CSE contains 0.1% CaCO$_3$.

The novel electrochemical secondary cells of the invention are characterized by an increased number of life cycles, and this may be greater by a factor of 10 times than that of known cells with cathodes containing such mixtures produced by application of a high pressure.

The crystalline product shows essentially no new phases of calcium oxide or magnesium oxide.

In the most general form, the present invention relates to cathodes for rechargable electrochemical lithium-type cells, where the cathode, in its discharged state is of the formula:

$$Li_{1-x}Q_{x/2}ZO_m,$$

where m is 2 for Ni, Co, Fe, Mn and 2.5 for V;
where Q is selected from calcium, magnesium, strontium, barium and from mixtures of any of these; where Z is selected from cobalt, nickel, manganese, Fe and V, with m designating the valency of the Z cation and X designating the stoichiometric ratio for the replacement of Li by Q.

It is stressed again that we are dealing here with well-defined crystalline compounds, of defined stoichiometric composition.

Cells according to the invention contain a cathode based on crystalline compounds defined above, a suitable anode as will be defined and illustrated, and an electrolyte which is compatible with the anode and cathode.

Preferred are cells where the salt is dissolved in propylene carbonate (PC), ethylene carbonate (EC) dimethyl carbonate (DMC), diethyl carbonate (DEC), methyl formate (MF), lacton, dimethoxy ethane (DME), dioxolane, tetrahydrofurane (THF), or 2-methyl tetrahydrofuran (2Me-THF), or a mixture of any of these compatible with the cathode.

Preferred cells are those where the electrolyte salt is selected from LiAsF$_6$, LiBF$_4$, LiCF$_3$SO$_3$, LiN(CF$_2$SO$_2$)$_2$ LiClO$_4$, LiPF$_6$, LiI or LIBr.

According to one embodiment the cell comprises a polymer electrolyte, based on a polymer selected from poly(ethylene oxide) (PEO), poly(methyl-methacrylate) (PMMA), or poly(acrilonitrile) (PAN), containing a lithium salt.

In such cells PC, EC, DMC, DEC, MF, lacton, DME, dioxolane, THF, polymethylene glycol dimethyl ether (PEGDME), polyethylene glycol diethyl ether (PEGDEE), low molecular weight PEO based polymers, and 2 Me-THF or their mixture can be added to the polymer electrolyte, which co-solvents are compatible with the cathode in use.

According to yet another embodiment Li, Li alloy or lithiated graphite (Li$_x$C$_6$) based anodes are used.

According to claim 1, where M is ca. up to 5% (W/W) in the electrolyte and up to 0.5:1M to Li ratio in the cathode.

The addition of MO or MCO$_3$ to the cathode material during its synthesis serves both purposes of insertion of M$^{2+}$ into the LiCoO$_2$ lattice and the remainder of CaO or CaCO$_3$ serves as desiccant buffer. The MCO$_3$ salts have a very low solubility (lower than that of Li$_2$CO$_3$). This enhances the precipitation of CO$^=_3$ ions formed as reduction products at the anode (in electrolytes containing EC, DEC, PC, etc.) to form high quality compact MCO$_3$-Li$_2$CO$_3$ or M$_y$Li$_x$CO$_3$(SEI-Solid Electrolyte Interface), M$^{2+}$ doped SEIs also have high cationic conductivity.

Experimental

The compatibility of lithium and the Li$_x$CoO$_2$ and modified Li$_x$CoO$_2$ cathodes with the following four different electrolytes was determined at 20° C. with the use of a microcalorimeter:

| A | 1.7M LiAsF$_6$ | in MF |
|---|---|---|
| B | 1.5M LiAsF$_6$ | +0.2M LiBF$_4$ in MF |
| C | 1.7M LiAsF$_6$ | in MF/DMC (48/52) |
| D | 1.5M LiAsF$_6$ | +0.2M LiBF$_4$ in MF/DMC (48/52) |

The electrolytes contained less than 50 ppm water. Li$_1$CoO$_2$ was prepared by baking the appropriate mixture of CoCO$_3$ and Li$_2$CO$_3$ powders at 900° C. The product was ground to particles smaller than 53 μ.

Modified Li$_x$CoO$_2$ was prepared by similar baking of mixtures of CoCO$_3$, Li$_2$CO$_3$ and CaCO$_3$ powders (after ball milling) where the Li/Ca ratio was 1:0.06. Table 1 shows (PXRD) for LiCoO$_2$, modified LiCoO$_2$ and commercial LiCoO$_2$. It can be concluded that: a) our home-made LiCoO$_2$ is the 03 phase of LiCoO$_2$ and modified LiCoO has no new phases and is actually very similar to phase 03, i.e. we see no change in the lattice spacing. Thus we have no evidence for the complete insertion of calcium into the lattice to form Li$_x$Ca$_y$CoO$_2$. At least part appears to remain as CaO or CaCO$_3$ powder mixed with LiCoO$_2$.

SEM(EDX) measurements indicated that the modified LiCoO cathode contains the designed Co/Ca ratio of 1:0.06. Cathodes were made by mixing Li$_1$CoO$_2$ with 10% graphite and 10% teflon in 2-propanol and applying this paste to an Al Exmet grid. As a test vehicle a sprially wound 2/3A size SS cell was used. Electrode area was only 40 cm$^2$. These cells were changed at 0.3 mA cm$^{-2}$ to a cut off voltage of 4.2 V and discharged at 0.3 mA cm$^{-2}$ to a cut-off voltage of 2.7 V. At the end of each half cycle the cells were left for 1 to 1.5 hours under OCV conditions and at the end of this rest period the OCV was measured.

Compatibility tests indicated that electolytes A and B are highly reactive toward lithium and thus were not used for further tests. Electrolyte D showed the best compatibility with lithium while electrolyte C was not compatible with the cathode (FIGS. 1 and 2).

Cycling tests showed that cells with electrolyte C should be cycled up to 100 times with X(in Li$_x$CoO$_2$) of 0.4 (FIG. 3) but with a current efficiency of only 77%. Their OCV values as measured at the end of charge and at the end of discharge indicated continuous cathode degradation (FIG. 4). Cells with electrolyte D could be cycled only 10 times (FIG. 5). However cells with electrolyte D and the modified cathode were much more stable.

Their current efficiency was 92%, the X value in Li$_x$CoO$_2$ was 0.45 and they were stable for at least 50 cycles (FIG. 5). In addition, the OCV values which were measured at the end of discharge and at the end of charge showed insignificant cathode degradation (FIG. 6).

The reasons for this improvement of performance by the addition of $CaCO_3$ to the $LiCoO_2$ cathode are not well understood. It is possible, although not proven, that some calcium was inserted into the $Li_xCoO_2$ crystals. $CaCO_3$ decomposes at least partially to form $CaO+CO_2$. The improvement in performance may thus be a combined effect of doping of Ca into the $LiCoO_2$ to form $Li_xCa_yCoO_2$ and the remains CaO or $CaCO_3$ stays in the cathode structure. CaO and $CaCO_3$ may serve as buffer and desiccant (react with water and acid impurities). Following this discussion it is expected that Mg. Sr and Ba carbonates and oxides will act in the same way. Therefore their addition to the cathode ought to be beneficial. These alkaline earth carbonates and oxides may be added to the electolyte (both to aprotic nonaqueous or polymeric) instead or in addition to their addition to the cathode matrix.

The degradation of electrolytes with cycle number is common to all rechargeable lithium—aprotic nonaqueous and polymer electrolyte batteries. Thus the buffer desiccant action of MO and $MCO_3$ is beneficial to all of them. For example: $Li/Li_xMnO_2$, $Li/Li_xNiO_2$, $Li/Li_xVO_3$, $Li/Li_xCoO_2$, $Li/TiS_2$.

All these batteries may have either nonaqueous electrolyte based on PC, EC, DMC, DEC, MF, lacton, DME, Dioxolane THF, 2MTHF and the following lithium salts: $LiAsF_6$, $LiBF_4$, $LiCF_3SO_3$, $LiN(CF_3-SO_2)_2$, $LiClO_4$, $LiPF_6$, or these batteries may have a polymer electrolyte based on PEO, PMMA, PAN, polymethyl acrylate (PMA), polybutyl acrylate (PBA) and other polymers. Some time they contain some solvents listed above (gel type polymer electrolytes) and some lithium salt as listed above. In all these batteries both the salt and solvent or polymer undergo degradation reactions which are catalyzed by water and/or acid impurities. Thus the addition of MO and MCO to these batteries absorbs water and neutralizes acids and slows degradation processes and increases service life of the batteries.

The polymer electrolyte (PE) was prepared in an argone-filled glove box by casting on an inert support an acetonitrile (AN) solution of preweighted high molecular weight PEO (MW 5,000,000) PEGDME (MW 500 or 1000), $LiAsF_6$ and $Al_2O_3$ to give a 200 μ thick polymer of the composition: $LiAsF_6\,PEO_5P(EG)DME_{15}$ with 6% $Al_2O_3$(V:V) Composite cathode was prepared by casting of the above mentioned solution, excluding $Al_2O_3$ with $Li_{.094}Ca_{.03}CoO_{.2}$ and carbon powders, to give a 80 μ thick composite cathode 50% (V/V), 5% carbon W/W. A cell (FIG. 7) based on a Li anode polymer electrolyte and $LiCoO_2$ composite cathode was charged at 100 μA/cm² to cut-off voltage of 4.2 V and discharged at 100 μA/cm² to a cut-off voltage of 2.7 V at a temperature of 70° C. The conductivity of this polymer is $6.7\times10^{-4}$ ohm$^{-1}$ cm$^{-1}$ at 70° C. FIG. 8 shows the third charge/discharge cycle of this cell. It was cycled over 10 cycles.

TABLE 1

| Cell Parameters of $LiCoO_2$ | | | | |
|---|---|---|---|---|
| +D[A] | *d[A] | *Relative Intensity | **d[A] | **I/Io |
| 4.66 | 4.71 | 1 | 4.68 | 100 |
| 1.99 | 2.01 | 2 | 2.001 | 35 |
| 2.40 | 2.41 | 3 | 2.401 | 16 |

TABLE 1-continued

| Cell Parameters of $LiCoO_2$ | | | | |
|---|---|---|---|---|
| +D[A] | *d[A] | *Relative Intensity | **d[A] | **I/Io |
| 1.43 | 1.43 | 4 | 1.424 | 10 |
| 1.41 | 1.41 | 5 | 1.407 | 8 |
| 1.84 | 1.84 | 6 | 1.841 | 6 |
| 2.28 | 2.27 | 7 | 2.302 | 4 |

*This work
**Literature results for 03 phase
+This work, $LiCoO_2$ treated with calcium oxide SEM tests
SEM tests confirmed Li:Ca ratio of 1:0.06.

We claim:

1. A secondary electrochemical lithium cell, wherein the cathode, in a discharged state, is based on a crystalline compound with an X-ray pattern of the formula:

$$Li_{1-x}Q_{x/n}ZO_m$$

produced by a solid/solid reaction at a temperature above 750° C., wherein:

Q is a member selected from the group consisting of calcium, barium, magnesium, strontium and a combination thereof, x is smaller than 0.2, Z is a member selected from the group consisting of cobalt, nickel, manganese, iron and vanadium, m is 2 for cobalt, nickel, manganese and iron, and, m is 2.5 vanadium.

2. The secondary electrochemical cell according to claim 1, wherein Q is a member selected from the group consisting of calcium, magnesium and a combination thereof, and wherein Z is cobalt.

3. The secondary electrochemical cell according to claim 2, wherein the cathode is derived from oxides, hydroxides, nitrates or carbonates.

4. The secondary electrochemical cell according to claim 1, wherein an anode material is a member selected from the group consisting of lithium, lithium alloys and a lithium intercalated carbonaceous material.

5. The secondary electrochemical cell according to claim 1, wherein the electrolyte comprises an aprotic non-aqueous solvent, an aprotic polymer or a composite solid electrolyte containing a lithium salt.

6. The secondary electrochemical cell according to claim 5, wherein the lithium salt in the electrolyte is a member selected from the group consisting of $LiAsF_6$, $LiBF_4$, $LiCF_3SO_3$, $LiN(CF_3SO_2)_2$, $LiClO_4$ and $LiPF_6$.

7. The secondary electrochemical cell according to claim 5, wherein the salt is dissolved in PC, EC, DMC, DEC, MF, lacton, DME, dioxolane, THF, 2ME-THF or a combination of any of these compatible with the cathode.

8. The secondary electrochemical cell according to claim 5, wherein the cell comprises a polymer electrolyte, based on a polymer selected from PEO, PMMA, PAN containing a lithium salt.

9. The secondary electrochemical cell according to claim 8, wherein PC, EC, DMC, DEC, MF, lacton, DME, dioxolane, THF, PEGDME, PEGDEE, low molecular weight PEO-based polymers, and 2 Me-THF or a combination thereof, is added to the polymer electrolyte, which co-solvents are compatible with the cathode, in use.

10. The secondary electrochemical cell according to claim 1, wherein a Li-based anode, an Li alloy-based anode or a lithiated graphite (lithiated carbon)-based anode is used.

11. A process for production of a crystalline cathode, wherein the cathode, in a discharged state, is based on a crystalline compound with an X-ray pattern of the formula:

$$Li_{1-x}Q_{x/n}ZO_m,$$

wherein,

Q is a member selected from the group consisting of calcium, barium, magnesium, strontium and a combination thereof, x is smaller than 0.2, Z is a member selected from the group consisting of cobalt, nickel, manganese, iron and vanadium, m is 2 for cobalt, nickel, manganese and iron, and, m is 2.5 vanadium, said process comprising the step of:

interacting in a solid/solid reaction the foregoing components at a temperature above 750° C.

12. The process for production of a crystalline cathode according to claim 11, wherein said interacting step is carried out at approximately 900° C.

* * * * *